US011412281B2

(12) United States Patent
Kim et al.

(10) Patent No.: US 11,412,281 B2
(45) Date of Patent: Aug. 9, 2022

(54) CHANNEL RECOMMENDATION DEVICE AND OPERATING METHOD THEREFOR

(71) Applicant: LG ELECTRONICS INC., Seoul (KR)

(72) Inventors: Taejoon Kim, Seoul (KR); Yongtae Kim, Seoul (KR); Hyangjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/150,387

(22) Filed: Jan. 15, 2021

(65) Prior Publication Data

US 2021/0306690 A1 Sep. 30, 2021

(30) Foreign Application Priority Data

Mar. 24, 2020 (KR) .................. 10-2020-0035374

(51) Int. Cl.
*H04N 21/266* (2011.01)
*H04N 21/466* (2011.01)
*H04N 21/442* (2011.01)
*H04N 21/25* (2011.01)

(52) U.S. Cl.
CPC ......... *H04N 21/266* (2013.01); *H04N 21/251* (2013.01); *H04N 21/44222* (2013.01); *H04N 21/4668* (2013.01)

(58) Field of Classification Search
CPC ........... H04N 21/4532; H04N 21/4826; H04N 21/44222; H04N 21/25891; H04N 21/266; H04N 21/251; H04N 21/4668; H04N 21/6582; G06F 40/295; G06F 40/30
USPC ........................................................ 725/116
See application file for complete search history.

(56) References Cited

U.S. PATENT DOCUMENTS

| 2004/0203639 A1* | 10/2004 | Ozer | H04N 21/47 455/414.1 |
| 2015/0348402 A1* | 12/2015 | Lim | G08C 17/02 348/734 |
| 2017/0024465 A1* | 1/2017 | Yeh | G10L 25/54 |
| 2017/0161367 A1* | 6/2017 | Kemp | G06F 16/685 |
| 2021/0345005 A1* | 11/2021 | Kim | H04N 21/4755 |

OTHER PUBLICATIONS

Sil et al., Re-ranking for Joint Named-Entity recognition and Linking, Oct. 27-Nov. 1, 2013, ACM, CIKM'13, https://citeseerx.ist.psu.edu/viewdoc/download?doi=10.1.1.398.9086&rep=rep1&type=pdf (Year: 2013).*

* cited by examiner

*Primary Examiner* — Cynthia M Fogg
(74) *Attorney, Agent, or Firm* — Lee, Hong, Degerman, Kang & Waimey PC

(57) ABSTRACT

A channel recommendation device includes a memory, a communication interface configured to communicate with a display device, and a processor configured to extract N channels from electronic program guide (EPG) information, perform named entity recognition (NER) on the extracted N channels, obtain one or more of channels successful for the NER as a recommended channel, and transmit information about the recommended channel through the communication interface to the display device.

15 Claims, 11 Drawing Sheets

| FRG_CHAN | NAMED_ENT |
|---|---|
| 797-__-AAA-__-11-1-__-3-__-1 | [ {"bs_broadcaster":"BBB:bbb"} ] |

CHANNEL RECOMMENDATION DEVICE AND OPERATING METHOD THEREFOR

CROSS-REFERENCE TO RELATED APPLICATIONS

Pursuant to 35 U.S.C. § 119(a), this application claims the benefit of earlier filing date and right of priority to Korean Patent Application No. 10-2020-0035374, filed on Mar. 24, 2020, the contents of which are hereby incorporated by reference herein in its entirety.

BACKGROUND

The present disclosure relates to a channel recommendation device.

Digital TV services using wired or wireless communication networks are becoming common. Digital TV service can provide a variety of services that could not be provided in the conventional analog broadcasting service.

For example, IPTV (Internet Protocol Television), which is a type of digital TV service, and smart TV service provide bidirectionality that allows a user to actively select a type of viewing the program and viewing time. IPTV, smart TV service may provide a variety of additional services, such as Internet search, home shopping, and online games based on this bidirectionality.

Also, recent TVs provide a speech recognition service that recognizes a speech uttered by a user and performs a function corresponding to the speech.

The speech recognition service is based on natural language processing (NLP) intent analysis.

The TV may select one channel through random selection logic among tuned channels and recommend a channel name of the selected channel to a user. The user can view the corresponding channel through the utterance of the recommended channel name.

However, in the related art, since a channel selected through random selection logic is recommended, usability of the user may not be considered and a suitable channel may not be recommended.

Also, in the related art, when the channel name is not sufficient in an entity name dictionary for intent analysis, intent analysis for the recommended channel name may fail.

SUMMARY

The present disclosure provides a device capable of recommending a channel by reflecting user log information.

The present disclosure provides a device capable of recommending a channel by named entity recognition (NER) performed on user log information and a dictionary.

According to one embodiment of the present disclosure, a channel recommendation device extracts N channels from electronic program guide (EPG) information based on user log information, performs named entity recognition (NER) on the extracted N channels, obtains one or more of channels successful for the NER as a recommended channel, and transmits information about the recommended channel through the communication interface to the display device.

The processor may be configured to extract the N channels from the EPG information based on user log information.

The user log information may include a frequency of viewing of channels, and the processor may be configured to extract channels, of which the frequency of viewing is greater than or equal to a certain number of times, among all channels included in the EPG information.

The information about the recommended channel may include a channel name of the recommended channel and a comment for guiding an utterance to the recommended channel.

The processor may be configured to receive the EPG information from the display device.

The processor may be configured to add a channel that has failed in the NER to a channel named entity dictionary, and the channel named entity dictionary may include a plurality of basic channel names and synonyms of each of the plurality of basic channel names.

The processor may be configured to determine whether the channel name of each of the extracted N channels is included in a channel named entity dictionary, and when the channel name is included in the channel named entity dictionary, determine that the NER is successful.

The processor may be configured to determine, as the recommended channel, a channel having the highest frequency of viewing among the channels successful for the NER.

The details of one or more embodiments are set forth in the accompanying drawings and the description below. Other features will be apparent from the description and drawings, and from the claims.

BRIEF DESCRIPTION OF THE DRAWINGS

FIGS. 11 and 12 are views illustrating a process of obtaining a recommended channel through two filtering processes according to an embodiment of the present disclosure.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
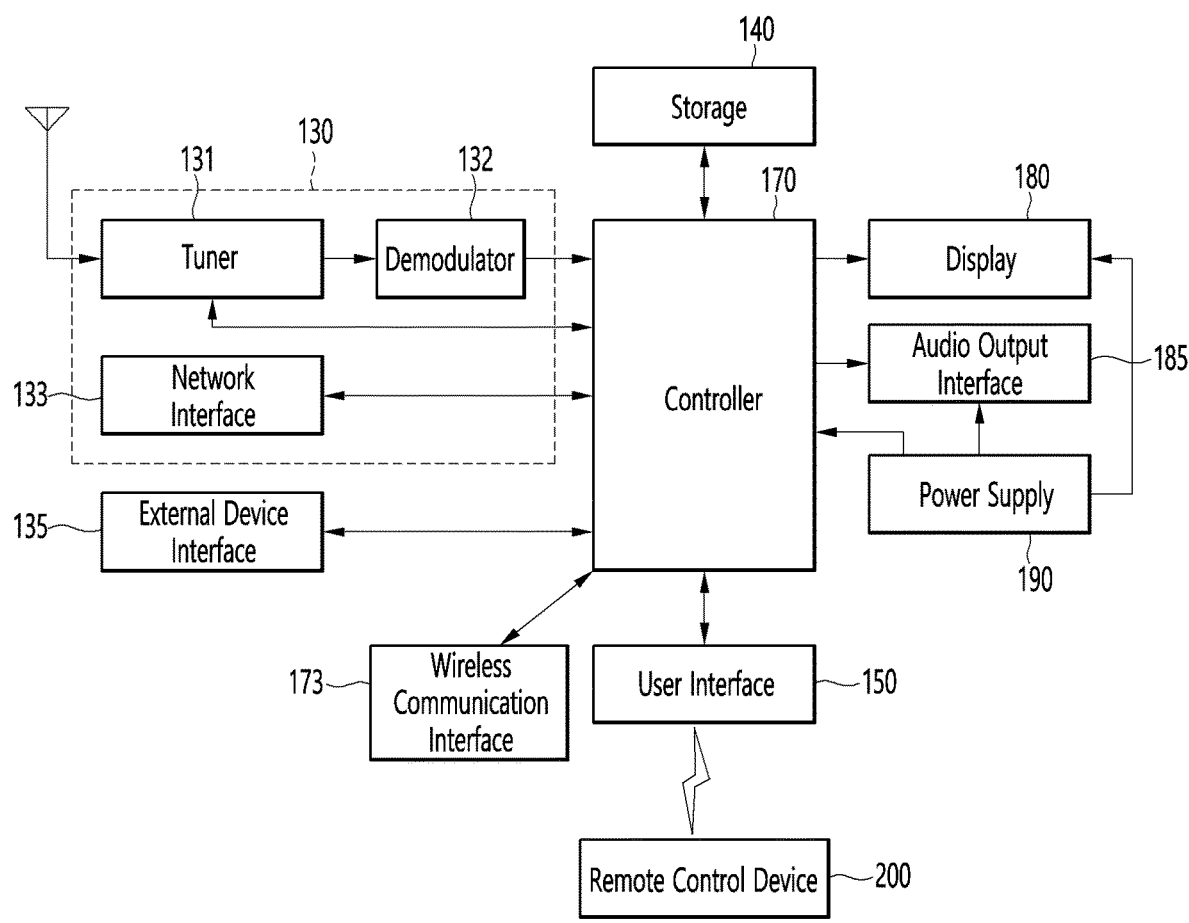
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast receiver 130, an external device interface 135, a storage 140, a user interface 150, a controller 170, a wireless communication interface 173, a display 180, an audio output interface 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The external device interface 135 can receive an application or an application list in an adjacent external device and deliver it to the controller 170 or the storage 140.

The external device interface 135 can provide a connection path between the display device 100 and an external device. The external device interface 135 can receive at least one an image or audio output from an external device that is wirelessly or wiredly connected to the display device 100 and deliver it to the controller 170. The external device interface 135 can include a plurality of external input terminals. The plurality of external input terminals can include an RGB terminal, at least one High Definition Multimedia Interface (HDMI) terminal, and a component terminal.

An image signal of an external device input through the external device interface 135 can be output through the display 180. A voice signal of an external device input through the external device interface 135 can be output through the audio output interface 185.

An external device connectable to the external device interface 135 can be one of a set-top box, a Blu-ray player, a DVD player, a game console, a sound bar, a smartphone, a PC, a USB Memory, and a home theater system, but this is just exemplary.

The network interface 133 can provide an interface for connecting the display device 100 to a wired/wireless network including the Internet network. The network interface 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface 133 can access a predetermined webpage through an accessed network or another network linked to the accessed network. In other words, the network interface 133 can transmit or receive data to or from a corresponding server by accessing a predetermined webpage through the network.

Then, the network interface 133 can receive contents or data provided from a content provider or a network operator. In other words, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an Internet or content provider or a network operator.

The network interface 133 can select and receive a desired application among applications open to the air, through network.

The storage 140 can store signal-processed image, voice, or data signals stored by a program in order for each signal processing and control in the controller 170.

Additionally, the storage 140 can perform a function for temporarily storing image, voice, or data signals output from the external device interface 135 or the network interface 133 and can store information on a predetermined image through a channel memory function.

The storage 140 can store an application or an application list input from the external device interface 135 or the network interface 133.

The display device 100 can play content files (for example, video files, still image files, music files, document files, application files, and so on) stored in the storage 140 and provide them to a user.

The user interface 150 can deliver signals input by a user to the controller 170 or deliver signals from the controller 170 to a user. For example, the user interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user interface 150 can deliver, to the controller 170, control signals input from local keys (not illustrated) such as a power key, a channel key, a volume key, and a setting key.

Image signals that are image-processed in the controller 170 can be input to the display 180 and displayed as an image corresponding to corresponding image signals. Additionally, image signals that are image-processed in the controller 170 can be input to an external output device through the external device interface 135.

Voice signals processed in the controller 170 can be output to the audio output interface 185. Additionally, voice signals processed in the controller 170 can be input to an external output device through the external device interface 135.

Besides that, the controller 170 can control overall operations in the display device 100. Additionally, the controller 170 can control the display device 100 by a user command or internal program input through the user interface 150 and download a desired application or application list into the display device 100 in access to network.

The controller 170 can output channel information selected by a user together with processed image or voice signals through the display 180 or the audio output interface 185.

Additionally, according to an external device image playback command received through the user interface 150, the controller 170 can output image signals or voice signals of an external device such as a camera or a camcorder, which are input through the external device interface 135, through the display 180 or the audio output interface 185.

Moreover, the controller 170 can control the display 180 to display images and control broadcast images input through the tuner 131, external input images input through the external device interface 135, images input through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content input from the outside, and the content can be in various formats such as broadcast images, external input images, audio files, still images, accessed web screens, and document files.

The wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), Zig-Bee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or on-screen display (OSD) signals, which are processed in the controller 170, or images signals or data signals, which are received in the external device interface 135, into R, G, and B signals to generate driving signals.

Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

Figure 2:
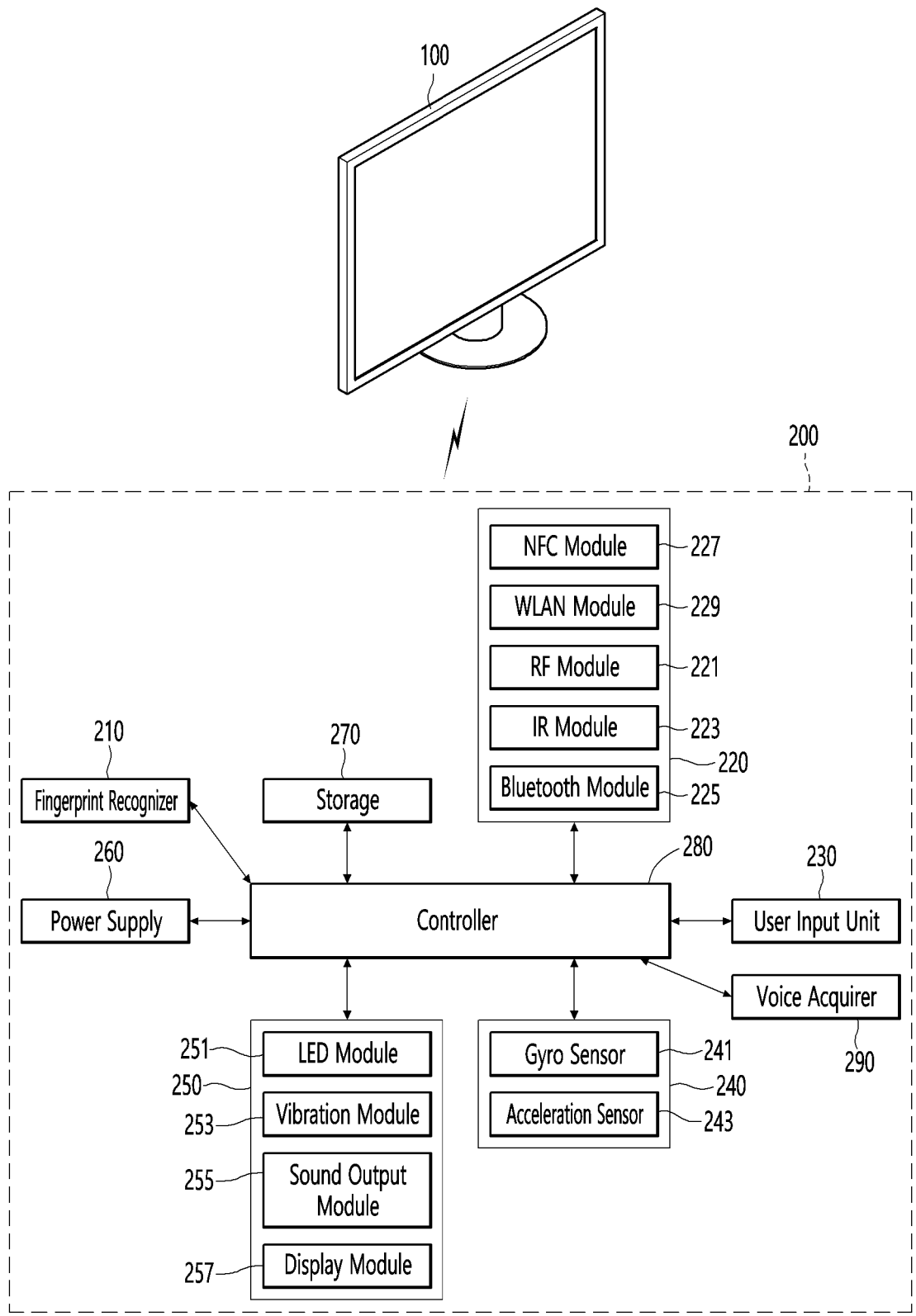
FIG. 2 is a block diagram illustrating a remote control device according to an embodiment of the present disclosure.
Figure 3:
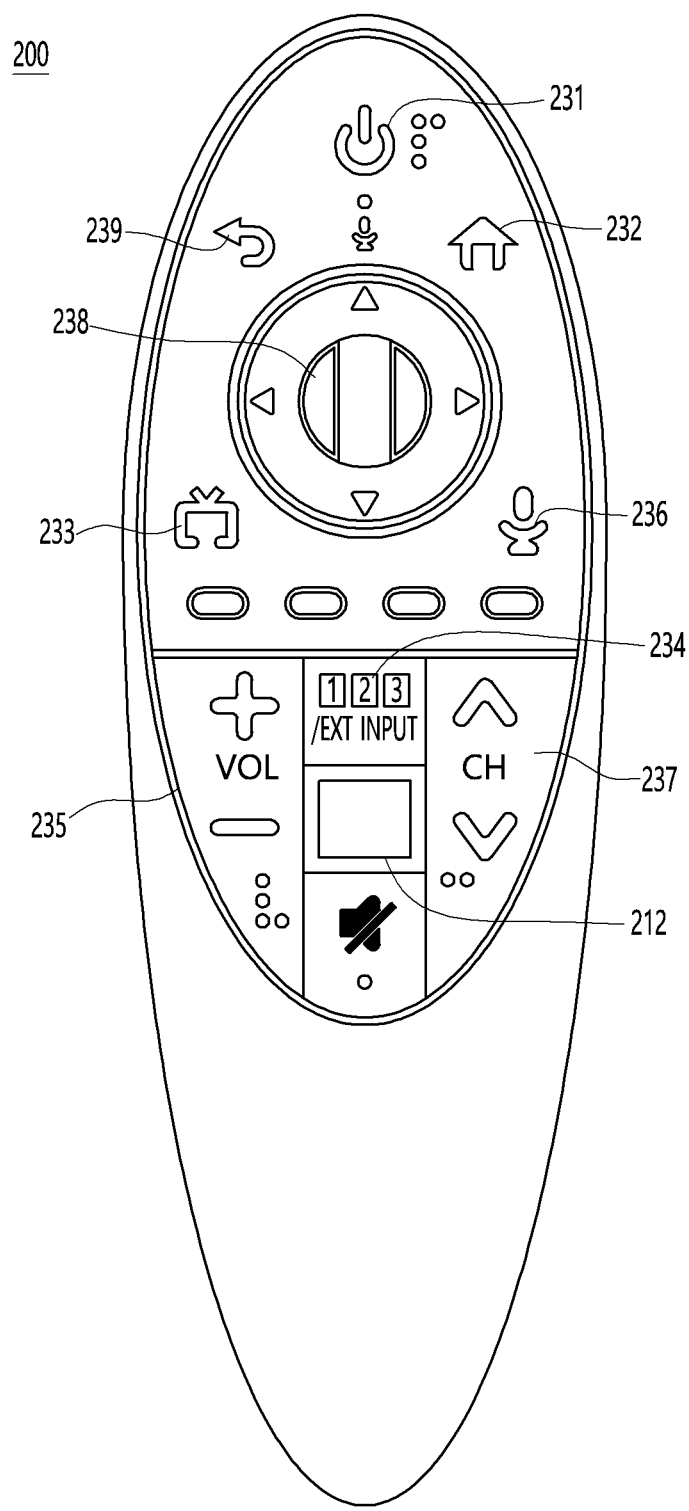
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognizer 210, a wireless communication interface 220, a user input interface 230, a sensor 240, an output interface 250, a power supply 260, a storage 270, a controller 280, and a voice acquirer 290.

Referring to FIG. 2, the wireless communication interface 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 225.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to control of the remote control device 200. The controller 280 can transmit a signal corresponding to a predetermined key manipulation of the user input interface 230 or a signal corresponding to movement of the remote control device 200 sensed by the sensor 240 to the display device 100 through the wireless communication interface 225.

Additionally, the voice acquirer 290 of the remote control device 200 can obtain voice.

The voice acquirer 290 can include at least one microphone and obtain voice through the microphone.

Figure 4:
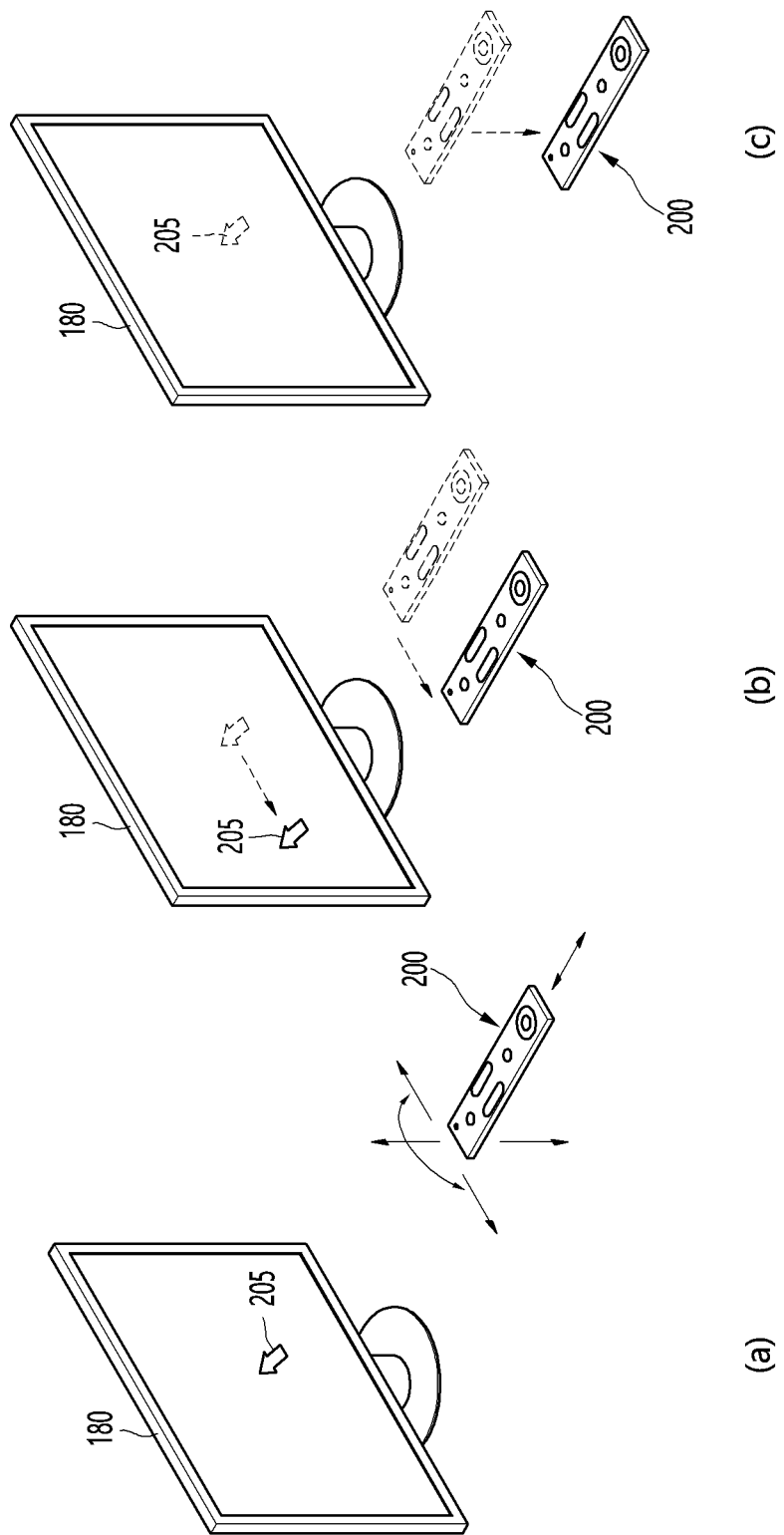
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(*a*) illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display 180. Thus, a selection area in the display 180 corresponding to the pointer 205 can be zoomed in and displayed larger.

On the contrary, when the user moves the remote control device 200 to approach the display 180, the selection area in the display 180 corresponding to the pointer 205 may be zoomed out and reduced.

On the other hand, if the remote control device 200 is moved away from the display 180, a selection area can be zoomed out and if the remote control device 200 is moved closer to the display 180, a selection area can be zoomed in.

Additionally, if a specific button in the remote control device 200 is pressed, recognition of a vertical or horizontal movement can be excluded. In other words, if the remote control device 200 is moved away from or closer to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
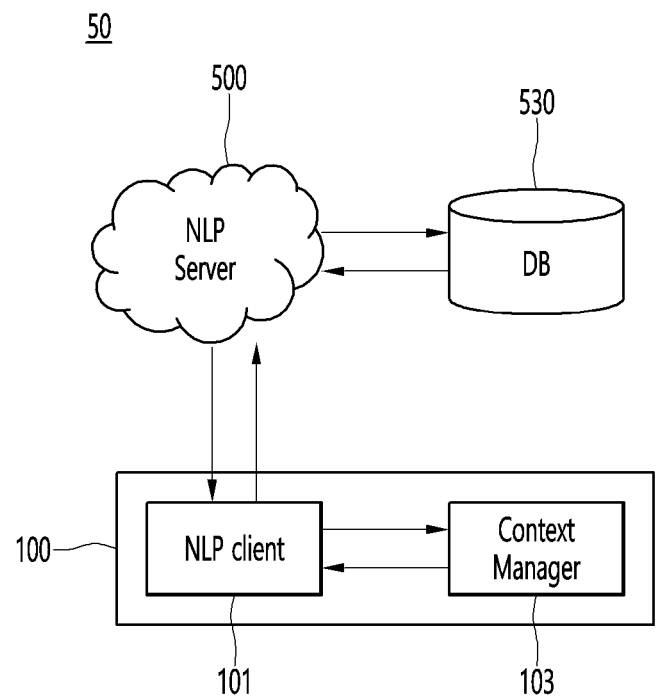
FIG. 5 is a view illustrating a configuration of a speech recognition system according to an embodiment of the present disclosure.

FIG. 5 is a view illustrating a configuration of a speech recognition system according to an embodiment of the present disclosure.

Referring to FIG. 5, a speech recognition system 50 may include a display device 100, a natural language processing (NLP) server 500, and a database (DB) 530.

The NLP server 500 may be referred to as an NLP device.

The display device 100 may transmit, to the NLP server 500, voice data corresponding to a voice command uttered by a user and electronic program guide (EPG) information of the display device 100.

The display device 100 may further include the components illustrated in FIG. 1 and an NLP client 101 and a context manager 103 illustrated in FIG. 5.

The NLP client 101 may be a communication interface that performs wireless communication with the NLP server 500.

The NLP client 101 may be included in the network interface 133 of FIG. 1.

The NLP client 101 may transmit the voice command and the EPG information of the display device 100 to the NLP server 500 and may receive utterance intent based on the transmitted information from the NLP server 500.

The context manager 103 may obtain the EPG information of the display device 100 and transmit the collected EPG information of the display device 100 to the NLP client 101.

The context manager 103 may be included in the controller 170 of FIG. 1.

The NLP server 500 may analyze a user's utterance intent based on the voice data and the EPG information corresponding to the voice command received from the display device 100.

The NLP server 500 may transmit utterance intent information including the analysis result to the NLP client 101 of the display device 100.

The DB 530 may store a plurality of pattern commands used to analyze the utterance intent of the voice command.

The DB 530 may be included in the NLP server 500.

Figure 6:
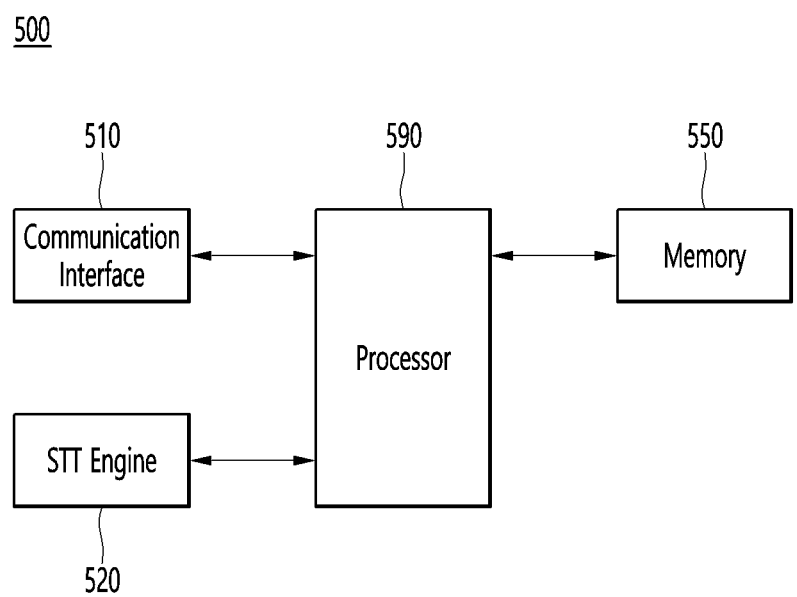
FIG. 6 is a block diagram illustrating a configuration of a natural language processing server according to an embodiment of the present disclosure.

FIG. 6 is a block diagram illustrating the configuration of the NLP server according to an embodiment of the present disclosure.

Referring to FIG. 6, the NLP server 500 according to the embodiment of the present disclosure may include a communication interface 510, an STT engine 520, a memory 550, and a processor 590.

The communication interface 510 may communicate with the display device 100 or an external server.

The communication interface 510 may provide an interface for connecting to a wired/wireless network including an Internet network. The communication interface 510 may transmit or receive data to or from the display device 100 or another electronic device through an accessed network or another network linked to the accessed network.

The STT engine 520 may convert voice data corresponding to a user's voice command into text data. The STT engine 520 may be configured separately from the NLP server 500.

The memory 550 may store a named entity recognition (NER) dictionary for NER.

The memory 550 may store a channel named entity dictionary including basic channel names extracted from the NER dictionary.

The memory 550 may store a filtered channel named entity dictionary based on EPG information.

The processor 590 may control overall operations of the NLP server 500.

The processor 590 may obtain a channel named entity dictionary from the NER dictionary.

The processor 590 may obtain, from the obtained channel named entity dictionary, a filtered channel named entity dictionary by extracting channel names included in EPG information.

The EPG information may be information received from the display device 100 or previously stored in the memory 550.

The processor 590 may convert voice data received from the display device 100 into text data.

The processor 590 may obtain a user's utterance intent based on the converted text data and channel names extracted from EPG information.

The processor 590 may transmit the obtained user's utterance intent to the display device 100 through the communication interface 510.

Next, the operating method of the speech recognition system, according to an embodiment of the present disclosure, will be described with reference to FIG. 7.

Figure 7:
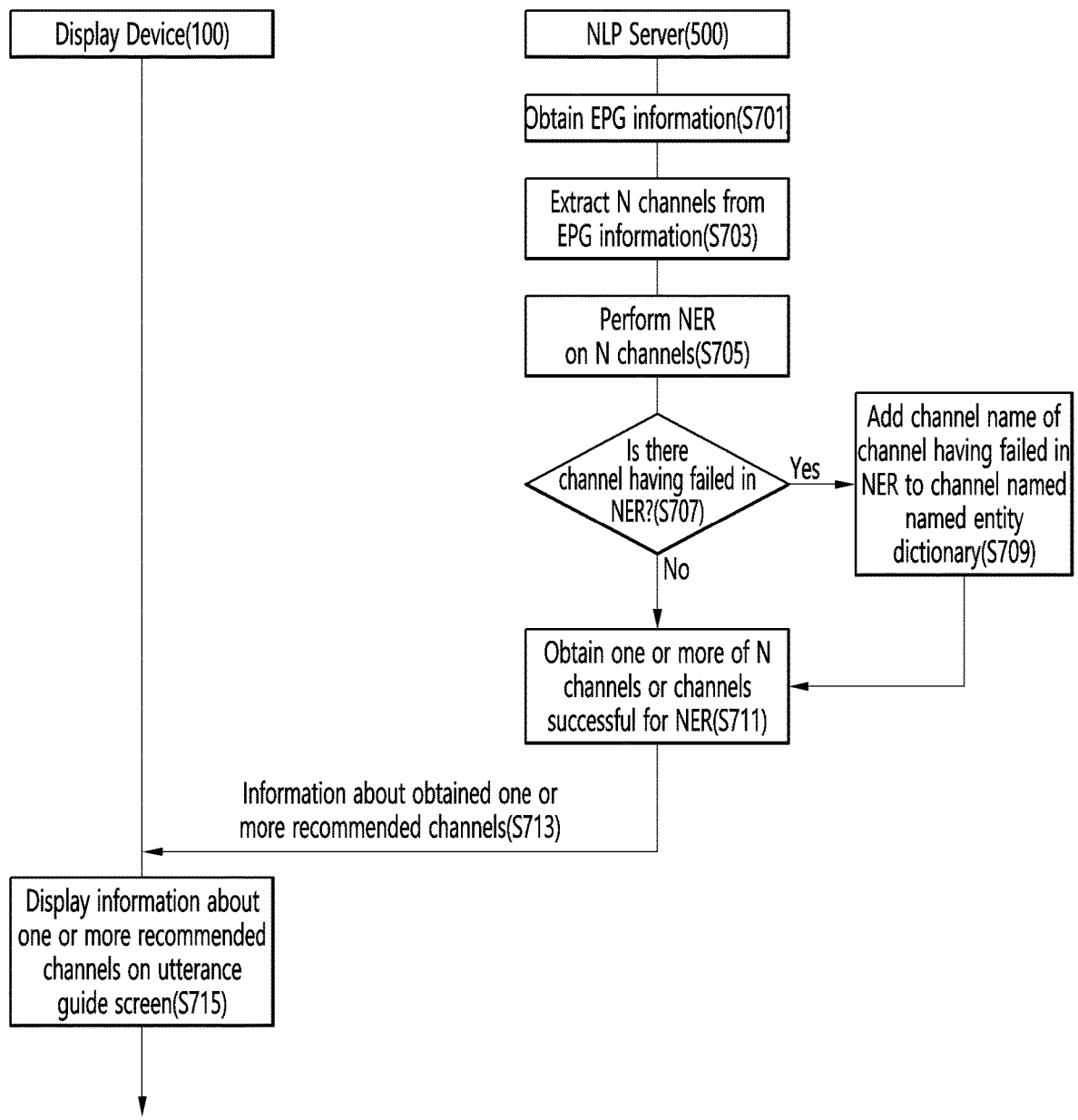
FIG. 7 is a ladder diagram for an operating method of a system according to an embodiment of the present disclosure.

FIG. 7 is a ladder diagram for an operating method of a system according to an embodiment of the present disclosure.

The system according to the embodiment of the present disclosure may include the display device 100 and the NLP server 500.

The processor 590 of the NLP server 500 obtains EPG information (S701).

The processor 590 may receive the EPG information from the display device 100 connected through the communication interface 510.

As another example, the processor 590 may receive EPG information from an external server that provides a program to the display device 100.

The EPG information may include information about channels that are tunable in the display device 100.

The information about each channel may include one or more of a name of a channel, a channel number, and a name of a program provided for each broadcast time of the corresponding channel.

The processor 590 of the NLP server 500 extracts N channels from the EPG information (S703).

In an embodiment, the processor 590 may extract N channels from all channels included in the EPG information, based on user log information.

The user log information may include one or more of information about a channel viewed by the user and the number of times the channel has been tuned by the user for a certain time.

The user log information may be obtained based on a voice command uttered by the user.

That is, the display device 100 may receive the voice command uttered by the user and transmit voice data corresponding to the received voice command to the NLP server 500.

The NLP server 500 may convert the voice data into text data, perform intent analysis on the converted text data, and extract a channel name.

The NLP server 500 may obtain the number of times the channel name has been extracted as the number of times the channel has been tuned.

The processor 590 may extract N channels, wherein the number of times of tuning of the channel or the number of times the same channel name has been extracted from all channels is greater than or equal to a preset number of times for a certain time. The certain time may be a week, and the preset number of times may be 10 times, but this is only an example.

Figures 8, 9:
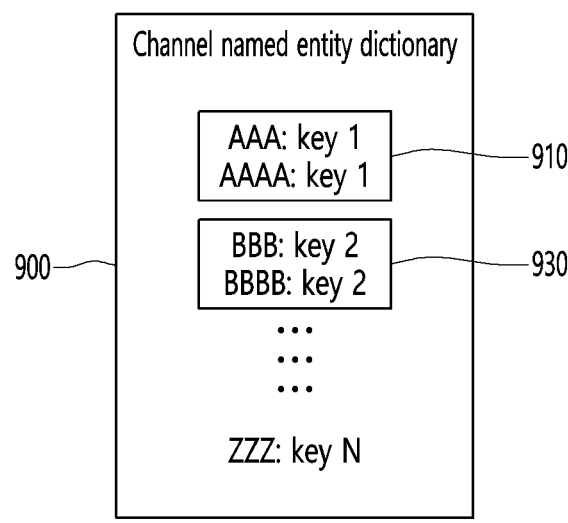
FIG. 8 illustrates an example of user log information according to an embodiment of the present disclosure.
FIG. 9 is a view for describing a channel named entity dictionary according to an embodiment of the present disclosure.

FIG. 8 illustrates an example of user log information according to an embodiment of the present disclosure.

Referring to FIG. 8, user log information 800 may include a first field 810 and a second field 830.

The first field 810 may include information about a channel being viewed when the user utters the voice command. The information about the channel may include one or more of a channel name and a channel number.

The second field 830 may include a channel name recognized through intent analysis for the user's voice command. The second field 830 may further include a channel number.

The display device 100 may transmit the collected user log information 800 to the NLP server 500. Whenever the user utters the voice command, the display device 100 may generate the user log information 800 and transmit the user log information 800 to the NLP server 500.

The processor 590 of the NLP server 500 may obtain the frequency of viewing (or the number of visits of the channel) of the channel within a predetermined time based on the received user log information 800.

In the case of FIG. 8, the frequencies of an AAA channel and a BBB channel may be increased by one.

When the frequency of viewing of the channel is more than a certain number of times within a certain time, the processor 590 of the NLP server 500 may primarily filter the channel as a recommended channel.

In this way, the processor 590 may extract N channels among all channels included in the EPG information.

FIG. 7 is described again.

The processor 590 of the NLP server 500 performs NER on the extracted N channels (S705).

The NER recognizes an entity having a name and may represent an algorithm for recognizing a type of a word meaning a name.

The processor 590 may perform NER by using an NER model. The NER model is a model that recognizes a named entity through a deep learning or machine learning algorithm, and a known model may be used.

The processor 590 may perform NER on each of the N channels by using the channel named entity dictionary stored in the memory 550.

The channel named entity dictionary may include a plurality of basic channel names corresponding to the plurality of basic channels and a plurality of synonyms corresponding to the plurality of basic channel names.

The processor 590 may determine whether the recognized named entity recognized by the NER is included in the channel named entity dictionary.

When the channel name of the extracted channel is included in the channel named entity dictionary, the processor 590 may determine that the NER is successful.

When the channel name of the extracted channel is not included in the channel named entity dictionary, the processor 590 may determine that the NER has failed.

The processor 590 of the NLP server 500 determines whether there is a channel that has failed in the NER according to the NER result (S707).

That is, based on the user log information, a channel that has failed in the NER may exist among the selected N channels.

When there is a channel that has failed in the NER, the processor 590 of the NLP server 500 adds the channel name of the corresponding channel to the channel named entity dictionary (S709).

If there is a channel that has failed in the NER, the processor 590 may add the channel name of the corresponding channel to the channel named entity dictionary so as to select the channel as a channel recommendation candidate in the future.

The channel named entity dictionary will be described with reference to FIG. 9.

FIG. 9 is a view for describing the channel named entity dictionary according to an embodiment of the present disclosure.

The channel named entity dictionary 900 may be stored in the memory 550 of the NLP server 500 or the database 530 provided as a separate configuration from the NLP server 500.

The channel named entity dictionary 900 may include a plurality of channel groups. Each channel group may correspond to one channel. Each channel group may include a channel name, a synonym of the channel name, and a key value for identifying the channel group.

Hereinafter, it is assumed that a first channel group 910 is previously included in the channel named entity dictionary 900, and a second channel group 930 corresponds to a second channel that has failed in the NER.

The first channel group 910 may include a channel name <AAA> corresponding to the first channel, a synonym <AAAA> of the channel name <AAA>, and a key value (key 1) for identifying the first channel.

When the NER for the second channel fails, the processor 590 may add the channel name corresponding to the second channel to the channel named entity dictionary 900.

When the NER for the second channel fails, the processor 590 may add the channel name <BBB> corresponding to the second channel and the synonym <BBBB> of the channel name <BBB> to the channel named entity dictionary 900.

The processor 590 may also allocate a key value (key 2) for identifying the second channel and add the key value (key 2) to the channel named entity dictionary 900.

FIG. 7 is described again.

When there is no channel that has failed in the NER, the processor 590 of the NLP server 500 obtains one or more recommended channels among N channels or channels that are successful for the NER (S711).

As an example, when there is no channel that has failed in the NER, the processor 590 may select, as the recommended channel, one channel having the highest frequency of viewing among the N channels.

As another example, when there is no channel that has failed in the NER, the processor 590 may select, as the recommended channel, one channel randomly selected among the N channels.

As another example, when there is no channel that has failed in the NER, the processor 590 may select, as the recommended channel, one channel associated with a position of a user among the N channels.

As another example, the processor 590 may select, as the recommended channel, one channel having the highest frequency of viewing among the channels that are successful for the NER.

As another example, the processor 590 may select, as the recommended channel, one channel randomly selected among the channels that are successful for the NER.

In the above example, only an example in which one channel is obtained as the recommended channel is provided, but the present disclosure is not necessarily limited thereto. Fewer than N channels may be obtained as the recommended channel.

The processor 590 of the NLP server 500 transmits information about the obtained one or more recommended channels to the display device 100 through the communication interface 510 (S713).

Information about the recommended channel may include a channel name and a channel number of the recommended channel.

The information about the recommended channel may further include a text corresponding to a comment for tuning or searching the recommended channel. The comment may be <Turn on> or <Search>, but this is only an example.

The controller 170 of the display device 100 displays, on an utterance guide screen, information about one or more recommended channels received from the NLP server 500 (S715).

The utterance guide screen may be a screen for guiding a user's utterance so as to provide a speech recognition service.

Figure 10:
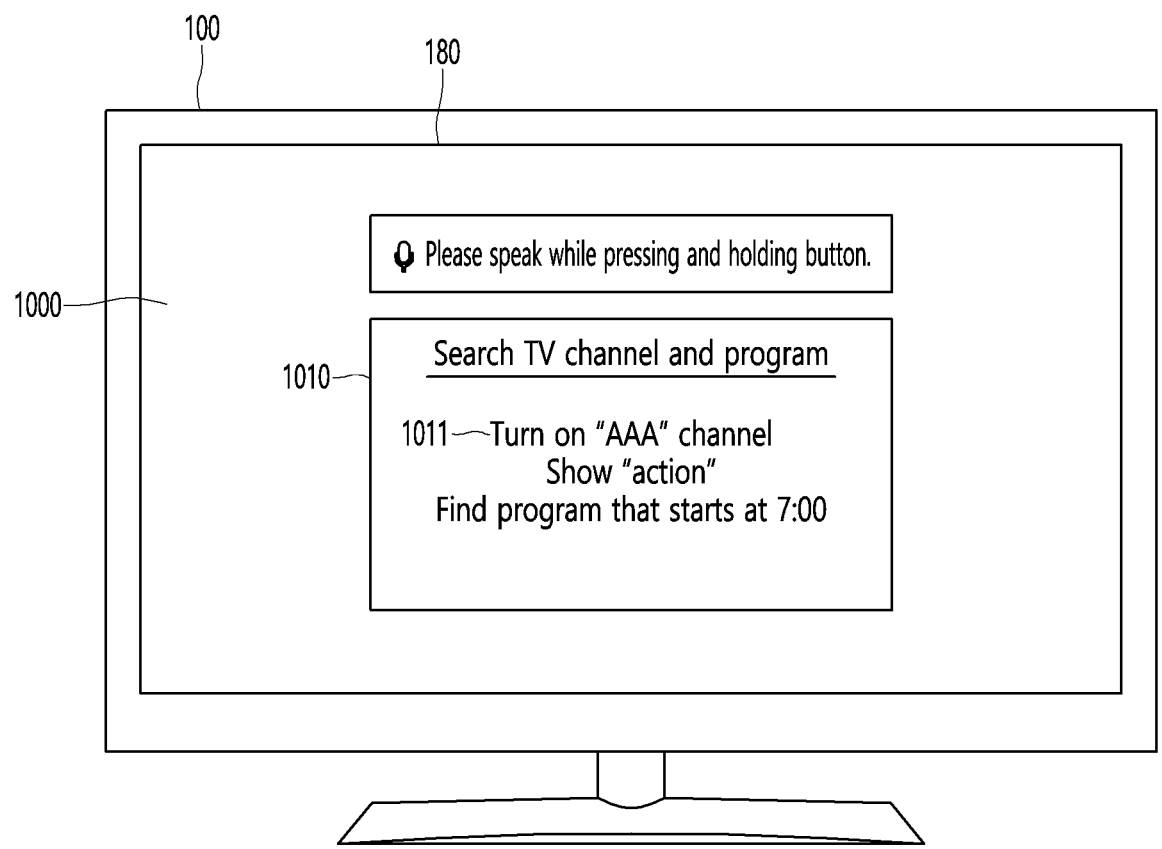
FIG. 10 illustrates an example of an utterance guide screen according to an embodiment of the present disclosure.

FIG. 10 illustrates an example of the utterance guide screen according to an embodiment of the present disclosure.

Referring to FIG. 10, after power is turned on, the display device 100 may display an utterance guide screen 1000 on the display 180.

The utterance guide screen 1000 may be a screen for guiding a user's utterance command for a speech recognition service.

The utterance guide screen 1000 may include a search window 1010 for searching channels and programs.

The search window 1010 may include information 1011 about the recommended channel received from the NLP server 500.

The information 1011 about the recommended channel may include a name of the recommended channel and a text that guides tuning to the corresponding channel.

A channel suitable for a user's log record may be recommended to the user through the information 1011 about the recommended channel.

That is, according to an embodiment of the present disclosure, a channel suitable for a user's viewing may be timely recommended by using user log information.

Figure 11:
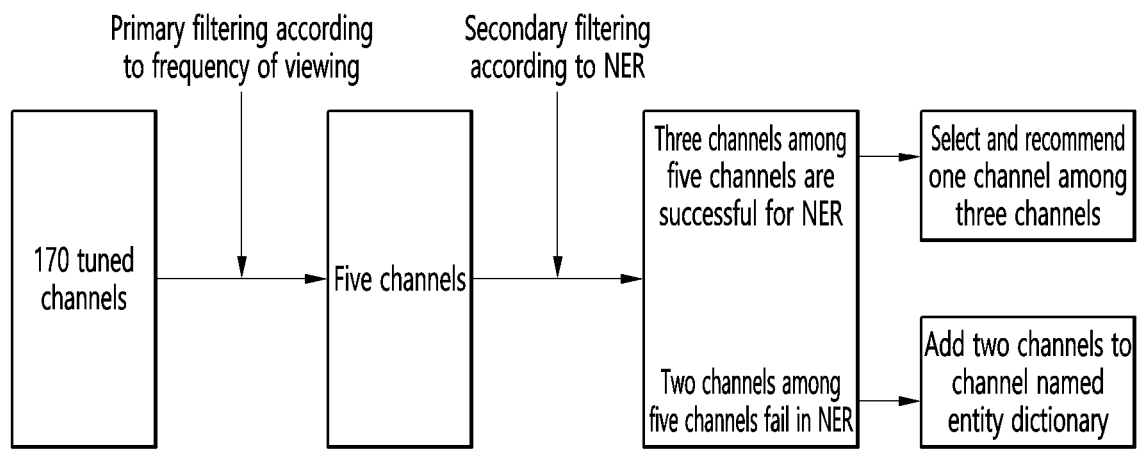
FIG. 11 is a view illustrating a process of obtaining a recommended channel through two filtering processes according to an embodiment of the present disclosure.
Figure 12:
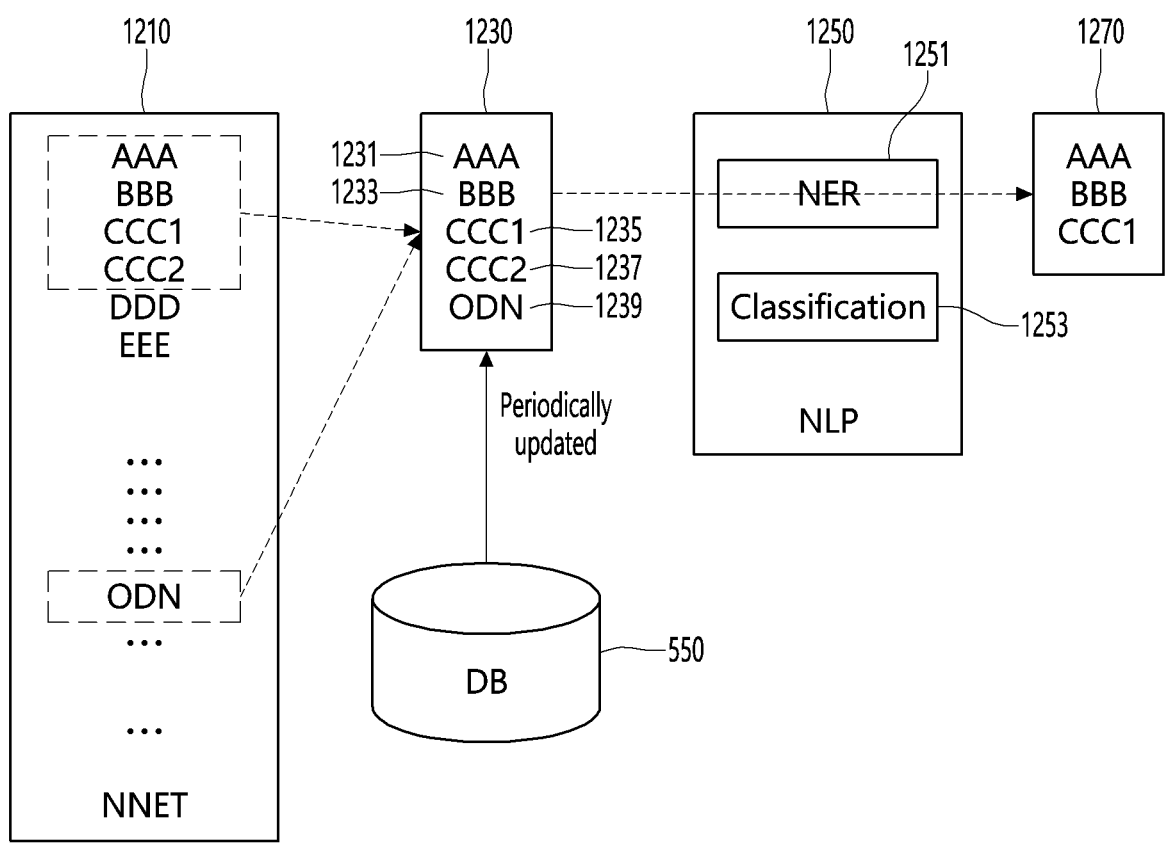

FIGS. 11 and 12 are views for describing a process of obtaining a recommended channel through two filtering processes according to an embodiment of the present disclosure.

FIG. 11 is described.

It is assumed that there are 170 channels tuned through EPG information.

The NLP server 500 may filter only five channels among the 170 channels according to the frequency of viewing.

The NLP server 500 may perform NER on each channel name of the five channels (secondary filtering).

The NER may be successful for three channels among the five channels and the NER may fail for two channels.

The NLP server 500 may determine, as a recommended channel, one channel among the three channels that are successful for the NER.

The NLP server 500 may update the channel named entity dictionary by adding, to the channel named entity dictionary, the channel names of the two channels that has failed i the NER.

This will be described in more detail with reference to FIG. 12.

EPG information 1210 may include a plurality of channel names corresponding to a plurality of channels.

The plurality of channels may be channels tuned or tunable through the display device 100.

The NLP server 500 may extract N channels 1230 from the plurality of channels based on user log information.

The NLP server 500 may extract N channels 1230, whose frequency of viewing is greater than or equal to a predetermined number of times, based on the user log information stored in the memory 550.

The NLP server 500 may periodically collect user log information and periodically update the list of the primarily extracted channels.

The NLP server 500 may perform NER 1251 on the N channels.

The NLP may include an NER process 1251 of recognizing the entity names and a classification process 1253 of recognizing the intent of an uttered sentence based on the recognized entity names.

According to an embodiment of the present disclosure, the NLP server 500 may obtain a channel group 1270 including channels 1231 to 1235 that are successful for the NER among the N channels.

Channels 1237 and 1239 that have failed in the NER may be stored in the channel named entity dictionary.

The NLP server 500 may determine, as a recommended channel, any one of the channels 1231 to 1235 included in the channel group 1270.

For example, the NLP server 500 may determine, as a recommended channel, a channel having the highest frequency of viewing among the channels 1231 to 1235.

The NLP server 500 may transmit information about the determined recommended channel to the display device 100.

As described above, according to an embodiment of the present disclosure, the NER used in the NLP is performed in advance for the primarily filtered channels, so that a reliable channel can be recommended.

Also, the channel name of the channel that has failed in the dictionary NER is updated in the channel named entity dictionary, thereby improving the performance of intent analysis of the voice command to be performed later.

Figure 13:
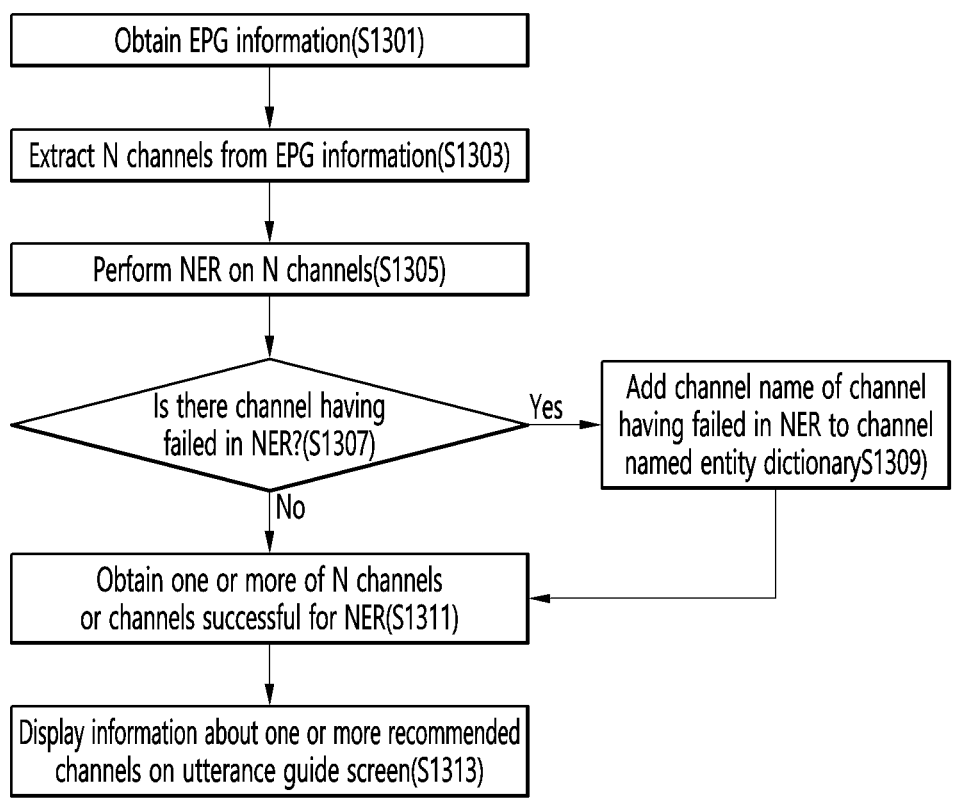
FIG. 13 is a view illustrating an operating method of a display device according to an embodiment of the present disclosure.

FIG. 13 is a diagram illustrating an operating method of a display device according to an embodiment of the present disclosure.

In particular, FIG. 13 is a view for describing an embodiment in which the display device 100 performs the operations performed by the NLP server 500 in FIG. 7.

Referring to FIG. 13, the controller 170 of the display device 100 obtains EPG information (S1301).

The controller 170 may receive EPG information from the NLP server 500 or a content providing server that provides broadcast content to the display device 100.

The controller 170 of the display device 100 extracts N channels from the EPG information (S1303).

The controller 170 may extract N channels among a plurality of channels included in EPG information based on user log information.

The user log information may be the frequency of viewing of each of the plurality of channels collected for a certain time.

The process of extracting the N channels is replaced with the description of S703 of FIG. 7 and FIG. 8.

The controller 170 of the display device 100 performs NER on the extracted N channels (S1305).

To this end, the storage 140 may store an NER model for the NER.

Also, the storage 140 may store the channel named entity dictionary in the storage 140 for channel name recognition.

The NER model and the channel named entity dictionary may be received from the NLP server 500.

The controller 170 of the display device 100 determines whether there is a channel that has failed in the NER according to the NER result (S1307).

When there is a channel that has failed in the NER, the controller 170 of the display device 100 adds the channel name of the corresponding channel to the channel named entity dictionary (S1309).

When there is no channel that has failed in the NER, the controller 170 of the display device 100 obtains one or more recommended channels among N channels or channels that are successful for the NER (S1311).

The controller 170 of the display device 100 displays, on an utterance guide screen, information about the obtained one or more recommended channels (S1313).

According to the embodiment of FIG. 13, the display device 100 may display the recommended channel on the display 180 by using the user log information and the NER.

When power of the display device 100 is turned on, the controller 170 may display the recommended channel on the utterance guide screen.

The user may be provided with the recommendation of the channel suitable for himself or herself through the recommendation channel recommended on the utterance guide screen. The user may easily access the recommended channel through the recommended channel without a separate search process.

According to various embodiments of the present disclosure, the channel suitable for the user may be recommended by using the user log information.

Also, the channel that is reliable in the intent analysis aspect may be recommended by using the NER in the dictionary.

Also, according to the embodiment of the present disclosure, the performance of the intent analysis for the channel having failed in the NER performed before the intent analysis may be improved through the dictionary update.

According to an embodiment of the present disclosure, the above-described method may be embodied as a processor readable code on a medium in which a program is recorded. Examples of processor-readable media include ROM, RAM, CD-ROM, magnetic tape, floppy disk, optical data storage device, and the like, and may be implemented in the form of a carrier wave (for example, transmission over the Internet).

The display device described above may not be limitedly applied to the configuration and method of the above-described embodiments, but the embodiments may be configured by selectively combining all or some of the embodiments so that various modifications may be made.

What is claimed is:

1. A channel recommendation device comprising:
    a memory configured to store a channel named entity dictionary;
    a communication interface configured to communicate with a display device; and
    a processor configured to:
        extract N channels from electronic program guide (EPG) information based on user log information;
        perform named entity recognition (NER) for the extracted N channels for determining whether a channel name of each of the extracted N channels is included in the channel named entity dictionary;
        obtain one or more of channels successful for the NER as a recommended channel; and
        transmit information about the recommended channel through the communication interface to the display device.

2. The channel recommendation device according to claim 1, wherein the user log information includes a frequency of viewing of channels, and
    wherein the processor is configured to extract channels, of which the frequency of viewing is greater than or equal to a certain number of times, among all channels included in the EPG information.

3. The channel recommendation device according to claim 2, wherein the processor is configured to determine, as the recommended channel, a channel having the highest frequency of viewing among the channels successful for the NER.

4. The channel recommendation device according to claim 1, wherein the information about the recommended channel includes a channel name of the recommended channel and a comment for guiding an utterance to the recommended channel.

5. The channel recommendation device according to claim 1, wherein the processor is configured to receive the EPG information from the display device.

6. The channel recommendation device according to claim 1, wherein the processor is configured to add a channel that has failed in the NER to the channel named entity dictionary, and
wherein the channel named entity dictionary includes a plurality of basic channel names and synonyms of each of the plurality of basic channel names.

7. The channel recommendation device according to claim 1, wherein the processor is configured to:
when the channel name is included in the channel named entity dictionary, determine that the NER is successful.

8. An operating method of a channel recommendation device, the operating method comprising:
extracting N channels from electronic program guide (EPG) information based on user log information;
performing named entity recognition (NER) on the extracted N channels for determining whether a channel name of each of the extracted N channels is included in a channel named entity dictionary;
obtaining one or more of channels successful for the NER as a recommended channel; and
transmitting information about the obtained recommended channel to a display device.

9. The operating method according to claim 8, wherein the user log information includes a frequency of viewing of channels, and
wherein the extracting of the N channels comprises extract channels, of which the frequency of viewing is greater than or equal to a certain number of times, among all channels included in the EPG information.

10. The operating method according to claim 9, further comprising determining, as the recommended channel, a channel having the highest frequency of viewing among the channels successful for the NER.

11. The operating method according to claim 8, wherein the information about the recommended channel includes a channel name of the recommended channel and a comment for guiding an utterance to the recommended channel.

12. The operating method according to claim 8, further comprising receiving the EPG information from the display device.

13. The operating method according to claim 8, further comprising adding a channel that has failed in the NER to the channel named entity dictionary,
wherein the channel named entity dictionary includes a plurality of basic channel names and synonyms of each of the plurality of basic channel names.

14. The operating method according to claim 8, further comprising:
when the channel name is included in the channel named entity dictionary, determining that the NER is successful.

15. A display device comprising:
a display;
a memory configured to store a channel named entity dictionary; and
a processor configured to:
extract N channels from electronic program guide (EPG) information based on user log information;
perform named entity recognition (NER) on the extracted N channels for determining whether a channel name of each of the extracted N channels is included in the channel named entity dictionary;
obtain one or more of channels successful for the NER as a recommended channel; and
display, on the display, information about the recommended channel.

* * * * *